US007647684B2

(12) United States Patent
Redford et al.

(10) Patent No.: US 7,647,684 B2
(45) Date of Patent: Jan. 19, 2010

(54) METHOD AND APPARATUS FOR FLAT MAIL SORTING PREPARATION

(75) Inventors: Dale E. Redford, Grand Prairie, TX (US); Paul E. Bernard, Ft. Worth, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 1046 days.

(21) Appl. No.: 10/730,648

(22) Filed: Dec. 8, 2003

(65) Prior Publication Data

US 2005/0120675 A1 Jun. 9, 2005

(51) Int. Cl.
*B23P 19/02* (2006.01)

(52) U.S. Cl. .......................... 29/426.4; 29/822; 29/712; 53/381.2; 53/385.1; 209/900

(58) Field of Classification Search ................. 209/900; 53/381.1, 381.2, 385.1; 29/426.3, 426.4, 29/822, 239, 712
See application file for complete search history.

(56) References Cited

U.S. PATENT DOCUMENTS 3,889,442 A * 6/1975 Grahn et al. .................. 53/492
4,318,322 A 3/1982 Russell .......................... 83/94
4,817,260 A 4/1989 Martin ...................... 29/426.6
4,889,397 A 12/1989 Ryan .......................... 312/320
4,936,735 A 6/1990 Ryan .......................... 414/679
4,991,914 A 2/1991 Kerstein ..................... 312/319
5,090,573 A 2/1992 Takahashi et al. ........... 209/534
5,472,097 A 12/1995 Villachica ................... 209/546
6,005,212 A 12/1999 Van Lierde et al. ......... 209/586
6,347,710 B1 2/2002 Ryan, Jr. et al. ............ 209/900
6,501,041 B1 12/2002 Burns et al. ................. 209/584
6,523,697 B1 2/2003 Malatesta et al. ........... 209/656
6,714,834 B1 3/2004 Roth et al. .................. 700/217
2001/0020196 A1 9/2001 Cirrone
2002/0160897 A1* 10/2002 Weder ........................ 493/340
2005/0045531 A1* 3/2005 Bretschneider et al. ..... 209/584

FOREIGN PATENT DOCUMENTS

EP 0 397 680 1/1984

* cited by examiner

*Primary Examiner*—David P Bryant
*Assistant Examiner*—Christopher M Koehler

(57) ABSTRACT

A method of preparing flat articles for sorting includes the steps of: (1) receiving a bundle of flat items to be sorted, the bundle being wrapped with a flexible film such that the film forms an enclosed package of flat items, (2) placing the bundles on a substantially horizontal, substantially frictionless work surface, moving the bundle adjacent at least one film slitter, the film slitter being automatically activated when the bundle is moved adjacent the film slitter, (3) removing the cut film from the flat items, and (4) stacking the unbundled flat items in a cartridge.

9 Claims, 5 Drawing Sheets

METHOD AND APPARATUS FOR FLAT MAIL SORTING PREPARATION

TECHNICAL FIELD

The invention relates to devices and methods for preparing bundled flat mail for sorting. In particular the invention relates to an improved workstation for unbundling flat mail and a method of using the same.

BACKGROUND OF THE INVENTION

The United States Postal Service (USPS) receives hundreds of thousands mail pieces on a daily basis from printers, premail processors and sorts and other entities for sorting and distribution. In many cases, these mail pieces are bound in bundles with combinations of plastic wrap and straps, the plastic wrap typically being a polyethylene or ethylene copolymer film while the straps are formed from nylon, polyester or a similar high-tensile strength material. Although these bundles are normally light enough to be readily handled, the straps and plastic wrap must nonetheless be removed, an awkward and time consuming task. After the mail has been unbundled, it must then be faced and edged prior to being fed to an automated sorting machine.

Currently, the process of unbundling, edging and facing mail is performed manually on an ad hoc basis. In some instances, the operator picks up an incoming bundle from an arriving container or transport, slices and removes the straps and plastic wrapping from the bundle using a hand-held knife. The unbundled mail must then be faced, edged and transferred to another container for transport to an automated sorter. These manual activities involve a large number of bends, lifts and turns on the part of the mail handler, motions that are ergonomically inefficient and time consuming. The present invention addresses these deficiencies.

SUMMARY OF THE INVENTION

In accordance with the invention, an apparatus for preparing flat articles for sorting includes a work table with a substantially horizontal, frictionless work surface for supporting film-wrapped bundles of flat articles to be sorted. The work table is provided with one or more hot air film slitters mounted adjacent the table for slitting the film and a sensor for activating the slitter when a bundle is moved adjacent the hot air slitter. A retractable clipper is also mounted adjacent or on the table for slicing flexible bands that may be secured around the bundles.

In a preferred embodiment, a pair of hot air film slitters are mounted on the table and configured to simultaneously slit film on adjacent sides of the bundle. One or more contact switches are used to activate the hot air film slitters when the bundle is moved into position wherein the bundle contacts the switches.

In one aspect, the apparatus includes a cartridge for receiving unbundled flat items and a lift for supporting a plurality of such cartridges. In a preferred embodiment, the lift is self-adjusting such that as flat items are stacked into a cartridge positioned on the lift, the height of the cartridge is adjusted to maintain the top of the stack level, or approximately level with the height of the table.

In another aspect, the invention provides a method of preparing flat articles for sorting, including the steps of: (1) receiving a bundle of flat items to be sorted, the bundle being wrapped with a flexible film such that the film forms an enclosed package of flat items, (2) placing the bundles on a substantially horizontal, substantially frictionless work surface, moving the bundle adjacent at least one film slitter, the film slitter being automatically activated when the bundle is moved adjacent the film slitter, (3) removing the cut film from the flat items, and (4) stacking the unbundled flat items in a cartridge. In one variation, the method further includes the steps of removing flexible straps used to secure the bundles with a retractable clipper mounted adjacent the work surface and using a first film slitter is positioned at 90° relative to a second film slitter to simultaneously cut film on adjacent sides of the bundle. In a preferred embodiment, the film slitter(s) or cutter(s) a hot air slitters that are activated when the bundle touches a contact switch positioned to correspond with the bundle being adjacent to the film slitter.

DETAILED DESCRIPTION OF THE INVENTION

Figure 1:
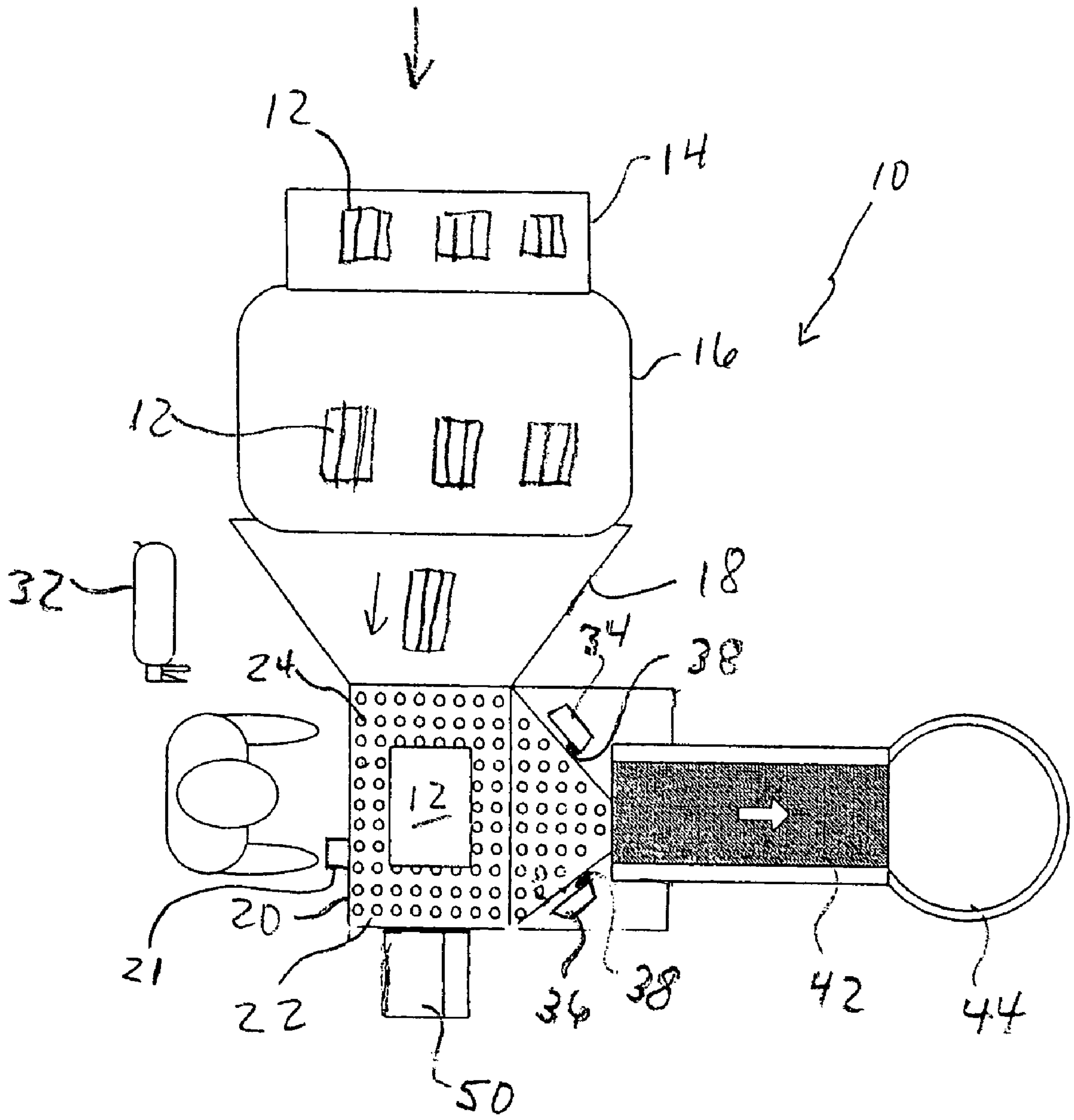
FIG. 1 is a schematic representation of a work station according to the invention.

Referring to FIG. 1, according to the invention, incoming bundles 12 of flat mail are introduced to workstation 10 with a "lift and tilt" device 14 such as a powered tiltable lift which deposits the mail pieces in an elevated holding bin 16. Bundles 12 are formed from a stack or stacks of mail pieces that have been wrapped in a plastic film to form an enclosed package. In some cases, the film-wrapped packages 12 of mail pieces will also be wrapped with flexible straps, typically made from a high tensile strength material such as nylon or polyester.

Bundles 12 from bin 16 are directed down an inclined funnel-like ramp 18 to a horizontal work table 20. To aid in manipulating bundles of mail on work table 20, the table is provided with an essentially frictionless working surface 22 by means of a plurality of ball or roller bearings 24 mounted in the surface of table 20 such that the bearings 24 may freely rotate. Alternatively, table 20 could be provided with a plurality of holes or orifices 26 through which compressed air is ejected to support objects placed on the table thereby providing an essentially friction-free working surface. Although as illustrated, inclined ramp 18 is used to convey bundles to work table 20, other means, such a horizontal or inclined belt or roller conveyor could also be utilized to transport bundles 12 to the table.

When a bundle 12 arrives on surface 22, operator 30 utilizes a retractable electrically or pneumatically powered clippers 32 to cut any bands from the bundle. Operator 30 then manipulates bundle 12, placing adjacent sides of the bundle against or immediately adjacent to a pair of conventional hot air slitters 34, 36 in order to cut the plastic wrap surrounding the bundle.

As shown, hot air slitter 34 is positioned at 90° relative to hot air slitter 36 which allows the operator to cut the plastic wrapping on two sides of the bundle simultaneously. To activate the slitter, operator 30 pushes a bundle 12 against one or more contact switches 38 which activate slitters 34, 36. Alternatively, the operator may position the bundle and activate slitters 34, 36 with a switch 21 that is preferably positioned so that the operator may activate the slitters by stepping on switch 21, thereby leaving the operators hands free to manipulate the bundle. After the operator cuts the plastic warp on two sides of bundle 12, he or she rotates the bundle 180° and repeats the process, cutting the plastic wrap on two additional sides of the bundle. If necessary, the operator may rotate bundle 12 again to cut the plastic wrap on one or both of the two remaining sides of the bundle.

After the plastic wrap or film has been cut, the operator peels or lifts the film from bundle 12 and slides the unbundled mail into a mail cartridge 50 on the side of surface 22 opposite ramp 18, edging the mail along the sides and bottom of the mail pieces. Bands and plastic film cut from bundles 12 along with any other debris is placed upon conveyor 42 which transports the debris to a trash receptacle 44.

Figure 2:
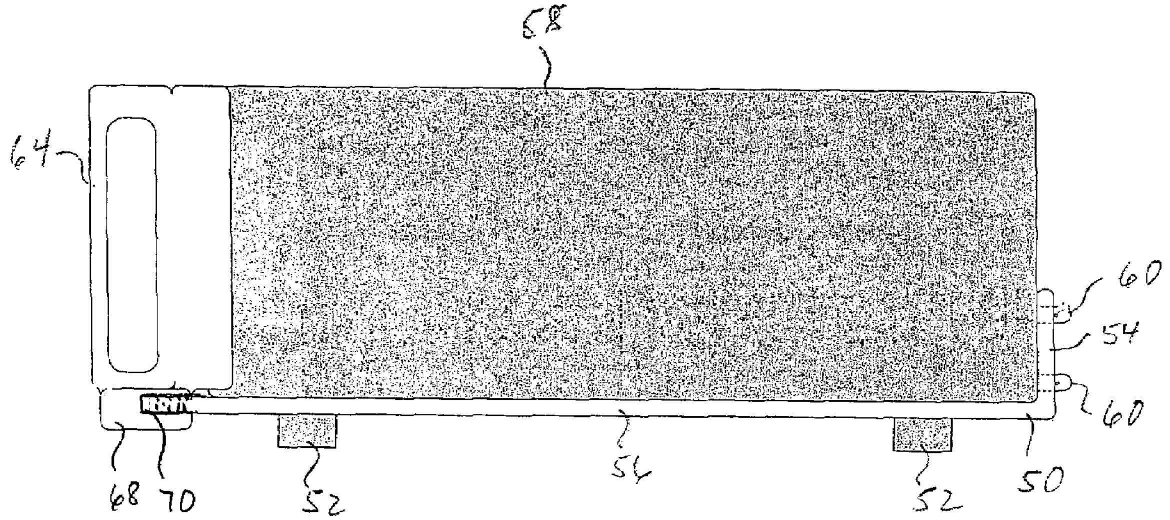
FIGS. 2 and 3 are side and end views, respectively, of a mail cartridge suitable for use in the practice of the invention.
Figure 3:
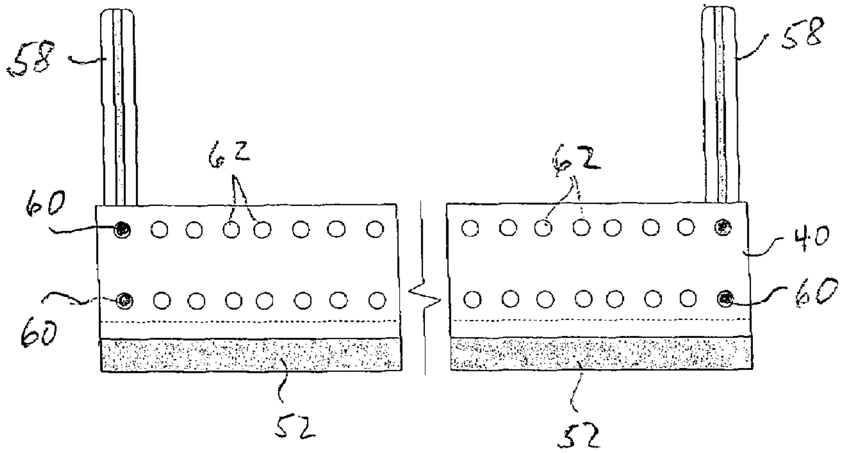

Turning to FIGS. 2 and 3, mail cartridge 50 is designed to allow the operator to edge mail along the sides and bottom of the mail pieces quickly and efficiently after the mail has been unbundled. Cartridge 50 comprises an end wall 54, bottom wall 56, rails 52 and one or more stack supports 58 and is open on the side opposite end wall 54 to allow the operator to place mail into the cartridge with a minimum of effort. Stack supports 58 include a handle 64 for positioning and removing the support from cartridge 50 and a pair of ball lock pins 60 inserted and secured in selected holes 62 formed in end wall 54 to hold support 58 in position.

Stack support 58 is also provided with a tab 68 at the end of the support adjacent handle 64 that is configured to fit into a slot 70 in bottom wall 56. Tab 68 and slot 70 include serrations 72 that interlock to secure stack support 58 in position in cartridge 50.

Figure 4:
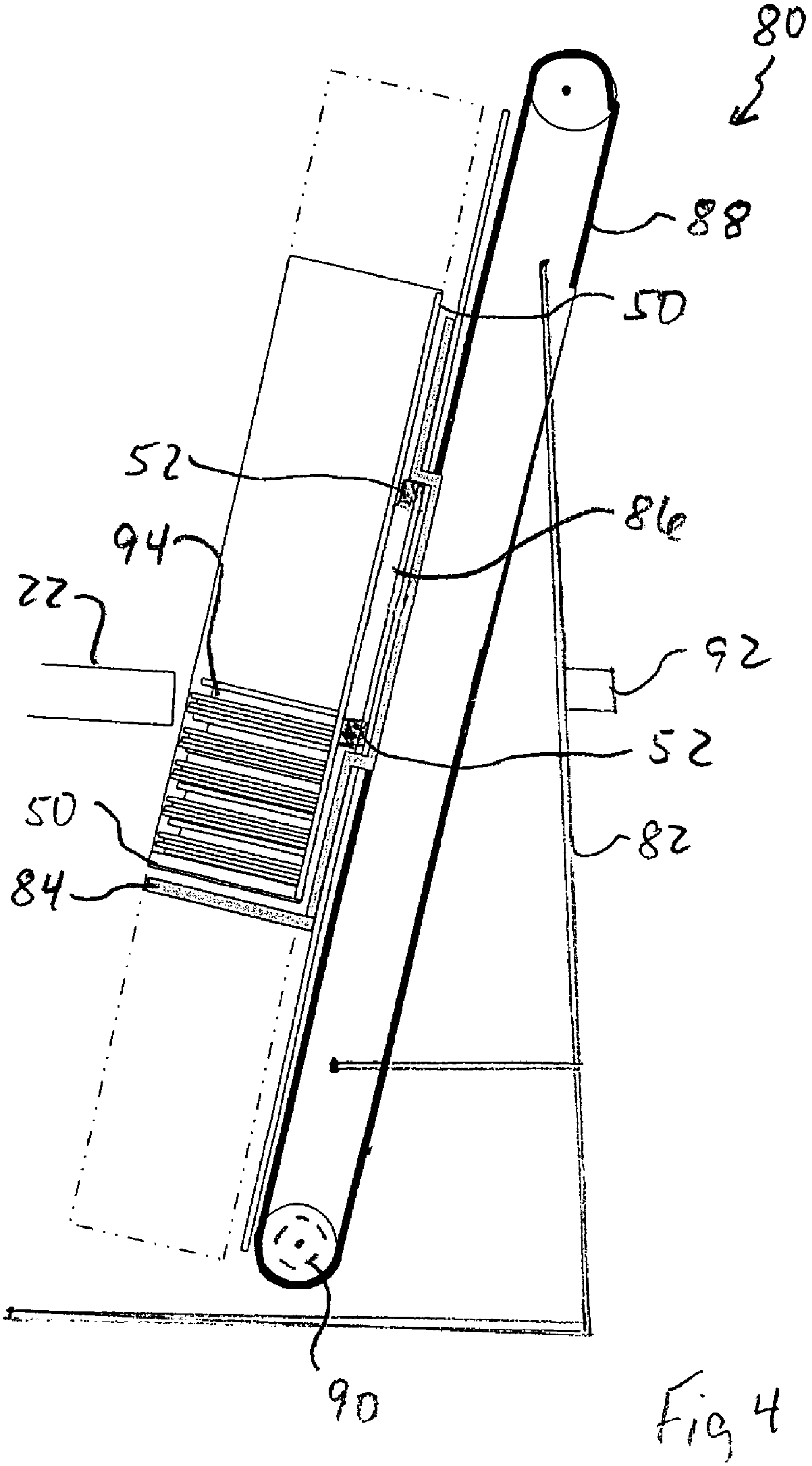
FIG. 4 is a partial side view of an adjustable lift suitable for use with the mail cartridge of FIGS. 2 and 3.

Turning to FIG. 4, in order to facilitate loading unbundled mail from working surface 22 into cartridge 50, a self adjusting lift 80 is provided. As illustrated, lift 80 includes a frame 82 and a movable cartridge support 84 with a recess 86 configured to receive rails 52 of cartridge 50 and support the cartridge in lift 80. Cartridge support 84 is mounted on an endless belt or chain 88 which is driven by motor 90 to raise or lower cartridge 50 relative to working surface 22 of work station 10. A sensor 92 detects when the operator has loaded a sufficient number of mail pieces into cartridge 50 to raise the height of mail piece stack 94 to a predetermined position adjacent working surface 22 and generates a signal which is used to actuate motor 90. Motor 90 in turn drives chain 88, lowering cartridge support 84 and cartridge 50 such that the top of stack 94 is maintained at a level no higher than working surface 22. As will be appreciated, maintaining the height of stack 94 enables the operator to move unbundled mail from work station 10 onto cartridge 50 with a minimum of movement and effort.

Figure 5:
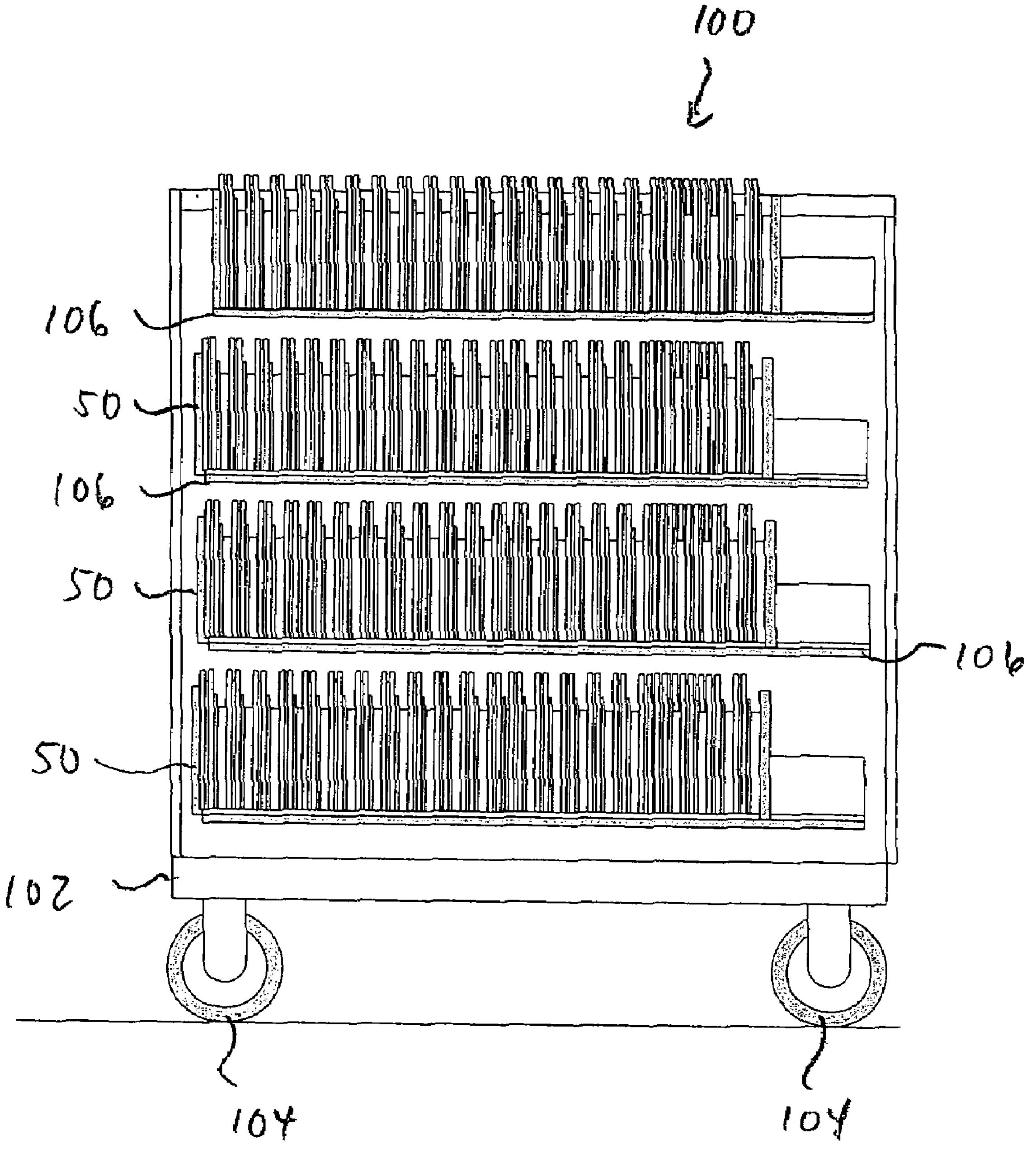
FIGS. 5 and 6 are side and end views of a cart adapted to transport the cartridges of FIGS. 2 and 3.
Figure 6:
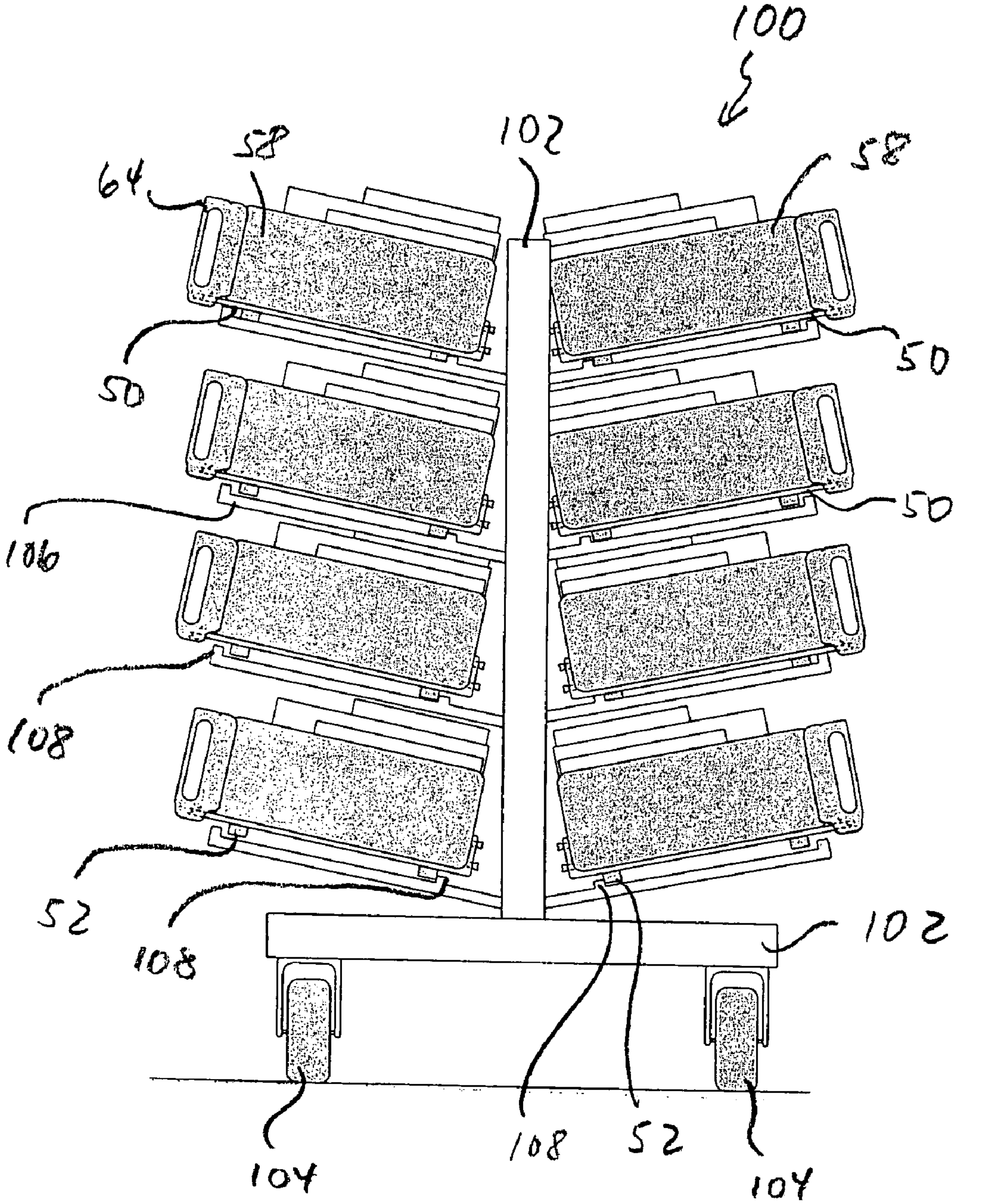

Turning to FIGS. 5 and 6, after a cartridge 50 has been filled with mail, the cartridge is transferred to a cart 100. As shown, cart 100 includes a T-shaped frame 102 mounted on casters or wheels 104, thereby allowing the cart to be easily moved between work station 10 and an automated sorting machine. Cart 100 includes a plurality of brackets 106, each of which is angled downwardly toward the center of frame 102. As shown, each of brackets 106 is provide with a pair of spaced apart ribs 108 positioned such that rails 52 of cartridges 50 fit between and engage one or both of ribs 108 to retain cartridges 50 in place on cart 100.

After cart 100 has been loaded with filled cartridges 50, the cart is moved to the feeder of an automated sorting machine. The cartridges are transferred, manually or with a powered transfer device to the feed where the operator removes stack supports 58 and slides the unbundled and edged mail from the cartridge onto the feeder for sorting.

As will be appreciated, the mail handling system of the invention reduces the amount of labor required to unbundle wrapped and strapped packages of mail received from bulk mailers, pre-sorters and similar entities. The mail handling system of the invention is also ergonomically efficient, reducing the number of lifts, turns and motions required of postal personnel. Further, while certain embodiments of the invention have been illustrated for the purposes of this disclosure, numerous changes in the method and apparatus of the invention presented herein may be made by those skilled in the art, such changes being embodied within the scope and spirit of the present invention as defined in the appended claims. For example, the stack supports could be fashioned to swing into and out of the holding position, rather than be detachable as described above.

The invention claimed is:

1. A method of preparing flat articles for sorting, comprising:

receiving a bundle of flat items to be sorted, the bundle being wrapped with a flexible film such that the film forms an enclosed package of flat items;

placing one of the bundles on a substantially horizontal work surface;

manually moving the bundle adjacent at least one automated film slitter which is mounted along one side of the horizontal work surface, the film slitter being automatically activated when the bundle is moved adjacent the film slitter on the work surface;

removing the cut film from the flat items; and stacking the unbundled flat items in a cartridge;

wherein a first film slitter is positioned at 90° relative to a second film slitter and wherein the method further comprises simultaneously cutting the film on at least two sides of the bundle, which sides are oriented at 90° relative to each other.

2. A method of preparing flat articles for sorting, comprising:

receiving a bundle of flat items to be sorted, the bundle being wrapped with a flexible film such that the film forms an enclosed package of flat items;

placing one of the bundles on a substantially horizontal work surface;

manually moving the bundle adjacent at least one automated film slitter which is mounted alone one side of the horizontal work surface, the film slitter being automatically activated when the bundle is moved adjacent the film slitter on the work surface;

removing the cut film from the flat items; and;

stacking the unbundled flat items in a cartridge, wherein the cartridge is supported in a self-adjusting lift, the lift adjusting the elevation of the cartridge such that the top of the stack of flat items is maintained adjacent the work surface.

3. A method of preparing flat articles for sorting, comprising:

receiving a bundle of flat items to be sorted into a holding bin which is elevated relative a work table proximate the holding bin, the bundle being wrapped with a flexible film such that the film forms an enclosed package of stacked flat items;

sliding the wrapped bundle along a chute from the holding bin to a horizontal work surface which comprises a top surface of the work table;

manually moving the wrapped bundle adjacent at least one automated film slitter which is mounted along one side of the horizontal work surface, the film slitter being automatically activated when the bundle is moved adjacent the film slitter on the work surface;

repeating the manual moving step as needed to slit the film along four sides of the bundle;

then manually removing the cut film from the flat items; and then manually stacking the unbundled flat items in a cartridge positioned in proximity to the work surface.

4. The method of claim 3, wherein the flat items comprise mail pieces, further comprising edging the mail pieces against side and bottom walls of the cartridge.

5. The method of claim 3, further comprising transferring a cartridge full of mail to a cart.

6. The method of claim 3, wherein a first automatic film slitter is positioned at 90 degrees relative to a second automatic film slitter, wherein the method further comprises simultaneously cutting the film on at least two sides of the bundle using the first and second slitters by manually positioning the bundle against the slitters so that the slitters are actuated.

7. The method of claim 3, wherein the film slitter is a hot air slitter, the method comprising using heated air to cut the film along four sides of the bundle.

8. The method of claim 3, wherein the substantially horizontal work surface is a substantially frictionless surface provided with ball bearings.

9. The method of claim 3, wherein the cartridge is supported in a self-adjusting lift, the lift adjusting the elevation of the cartridge such that the top of the stack of flat items is maintained adjacent the work surface.

* * * * *

UNITED STATES PATENT AND TRADEMARK OFFICE

CERTIFICATE OF CORRECTION

PATENT NO. : 7,647,684 B2
APPLICATION NO. : 10/730648
DATED : January 19, 2010
INVENTOR(S) : Redford et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1528 days.

Signed and Sealed this

Sixteenth Day of November, 2010

David J. Kappos
*Director of the United States Patent and Trademark Office*